United States Patent Office 3,531,499
Patented Sept. 29, 1970

3,531,499
3,4-ALKYLENE-DIOXYBENZYL BIGUANIDES
Laszlo Beregi, Boulogne-sur-Seine, Pierre Hugon, Rueil-Malmaison, and Jacques Duhault, Chatou, France, assignors to Societe en nom collectif Science Union et Cie, Societe Francaise de Recherche Medicale, Suresnes, France, a French society
No Drawing. Filed Apr. 2, 1968, Ser. No. 718,235
Claims priority, application Great Britain, Apr. 11, 1967, 16,470/67
Int. Cl. C07d 13/10, 15/18
U.S. Cl. 260—340.5     4 Claims

ABSTRACT OF THE DISCLOSURE $N_1$-(3,4-methylene- or ethylenedioxy-benzyl) biguanides optionally $N_1$ and $N_5$ substituted by lower-alkyl up to $C_4$ inclusive, and acid addition salts thereof.

These compounds possess hypoglycemic and lipid metabolism regulating properties.

SUMMARY AND BACKGROUND OF INVENTION

The present invention provides new biguanide compounds of the general Formula I:

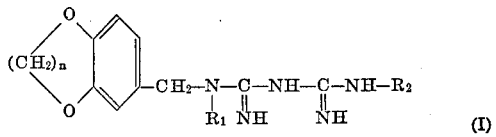

wherein $R_1$ and $R_2$ each represents a hydrogen atom or a lower-alkyl radical containing up to 4 carbon atoms, inclusive, and $n$ is the integer 1 or 2, and acid addition salts thereof, especially the physiologically tolerable salts of such compounds.

The compounds of the general Formula I and their physiologically tolerable salts are hypoglycemic agents which are effective in lowering the blood sugar level in mammals. The antidiabetic properties of certain biguanide compounds are known (see, for instance, "Archive. f. exp. Pathol. Pharmacol." 142 (1929), 290) and British Pat. No. 852,584. We have now surprisingly found that the methylenedioxy and ethylenedioxy derivatives have a lower toxicity and a greater degree of hypoglycemic activity than these known biguanide compounds. They have also a lipid metabolism regulating activity. The provision of such novel and valuable compounds, compositions thereof, and a method of treating therewith is an object of the present invention. Additional objects will become apparent hereinafter and still other objects will be be recognized by one skilled in the art.

DETAILS OF INVENTION

The compounds of this invention are prepared by methods known per se. The hydrochloride of an amine of General Formula II:

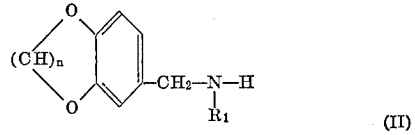

wherein $n$ and $R_1$ have the meanings previously defined, is condensed with a dicyandiamide of general Formula III:

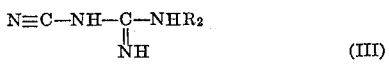

in which $R_2$ has one of the values previously given, and the biguanide hydrochloride recovered from the reaction mixture.

The bases of Formula I form acid addition salts with inorganic acids such, for example, as hydrochloric, hydrobromic, nitric, sulphuric, and phosphoric acid, as well as with organic acids such, for example, as acetic, malonic, succinic, maleic, fumaric, malic, tartaric, citric, benzoic, salicylic, and methane sulfonic acid.

The acute toxicity of the new compounds was studied intraperitoneally in mice and the $LD_{50}$ is situated between 130 and 210 mg./kg.

The blood sugar lowering activity was shown in the guinea pig by oral and subcutaneous administration. It was noted that the minimum active dose varies from 10 to 20 mg./kg. by the subcutaneous route and from 25 to 40 mg./kg. by the oral route. A lowering of 50% of the blood sugar is obtained with a dose of 30 to 40 mg./kg. s.c. and of 60 to 80 mg./kg. p.o. The action of these new compounds is especially long; the lowering of the blood sugar reaches its maximum 5 to 6 hours after administration p.o. and continues for 8 to 10 hours.

An interesting activity of the new compounds was observed on the lipid metabolism. Administered in the rat for 10 days at the dose of 50 to 100 mg./kg. per day, they provoke a diminution of weight increase, as great as 50%, in comparison with the untreated animals. In the same time a noticeable reduction of epididymal fat, as great as 25 to 35%, is noted in the animals treated with the new compounds, showing their activity on the reserve lipids.

The present invention also includes the pharmaceutical compositions for the treatment of diabetes mellitus and for the disorders of the lipid metablosim having, as active principle, a compound of the general Formula I or one of its physiologically tolerable salts, in admixture or conjunction with a pharmaceutically suitable carrier.

SPECIFIC EMBODIMENTS OF INVENTION

The following examples illustrate the present invention but are not to be construed as limiting the same, all parts being by weight and melting points being determined by the Kofler method.

Example 1.—$N_1$-(3,4-methylenedioxy-benzyl)-biguanide hydrochloride

A mixture of 56 parts of piperonylamine hydrochloride and 25 parts of dicyandiamide is heated gradually in an oil bath, with stirring, to 150–160° C. and maintained at this temperature for about one hour and then cooled. The resulting reaction product is boiled with 300 parts of isopropanol. After cooling, the crystallized product is filtered and recrystallized from isopropanol. 15 parts of $N_1$ - (3,4 - methylenedioxy - benzyl)-biguanide hydrochloride are obtained. Melting point 172–173° C.

By the same method as that described in Example 1, the following compounds are obtained:

Example 2.—$N_1$-methyl-$N_1$-(3,4-methylenedioxy-benzyl)-biguanide hydrochloride M.P. 199–201° C. (ethyl alcohol), produced in the manner of Example 1 starting from N-methylpiperonylamine hydrochloride and dicyandiamide.

Example 3.—$N_1$-(3,4-methylenedioxy-benzyl)-$N_5$-methyl-biguanide dihydrochloride M.P. 190–195° C. (ethylalcohol), produced in the manner of Example 1 starting from piperonylamine hydrochloride and N-methyldicyandiamide.

Example 4.—$N_1$ - (3,4-ethylenedioxy-benzyl) - biguanide hydrochloride $N_1$-(3,4-ethylenedioxy-benzyl)-biguanide hydrochloride, produced in the manner of Example 1 starting from 3,4 ethylenedioxy benzylamine hydrochloride and dicyandiamide.

Where the foregoing examples produce a compound having a methyl group, it is to be understood that compounds containing other lower-alkyl groups of straight or branched nature and containing up to four carbon atoms inclusive, such as ethyl, propyl, isopropyl, butyl, sec.-butyl, and t.-butyl are prepared in the same manner by substitution in the process of the appropriate different lower-alkyl starting material.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways or modes, for example, orally as in capsules or tablets, parenterally in the form of sterile solutions, suspensions, or by pellet implantation, and in some cases intravenously in the form of sterile solutions. Other modes of administration are cutaneously, subcutaneously, bucally, intramuscularly, and intraperitoneally.

As representative of living animal bodies which may be treated with the compounds and compositions of the invention, and according to the method of treating of the invention, for alleviation of the same and/or similar conditions as those described may be mentioned the following: domestic animals such as dogs and cats, farm animals such as horses, cows, sheep, and goats, fur-bearing animals such as mink, seal, muskrat, fox, raccoon, ermine, and weasel, and zoo animals such as bears, antelope, monkeys, baboons, and the like.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, put preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention may be used in cases of administration to subjects having a relatively low body weight, unit dosages are preferably ten milligrams or above and preferably twenty, fifty, or one-hundred milligrams, or even higher, depending of course upon the subject treated and the particular result desired, as will be apparent to one skilled in the art. Broader ranges appear to be ten to 200 milligrams per unit dose. The active agents of the invention may be combined for administration with other pharmacologically active agents, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical principles.

Various modifications and equivalents will be apparent to one skilled in the art and may be made in the compounds, compositions and methods of the present invention without departing from the spirit or scope thereof, and it is therefore to be understood that the invention is to be limited only by the scope of the appended claims.

We claim:

1. A compound selected from the group consisting of (A) biguanide compounds of the Formula I:

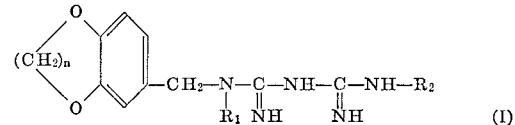

wherein $R_1$ and $R_2$ are selected from the group consisting of hydrogen and lower-alkyl having a maximum of 4 carbon atoms, and $n$ is an integer selected from the group consisting of 1 and 2, and (B) physiologically acceptable addition salts thereof with organic and mineral acids.

2. A compound of claim 1 which is $N_1$-(3,4-methylenedioxy-benzyl)-biguanide pharmaceutically acceptable acid addition salt.

3. A compound of claim 1 which is $N_1$-methyl-$N_1$-(3,4-methylenedioxy-benzyl)-biguanide pharmaceutically acceptable acid addition salt.

4. A compound of claim 1 which is $N_1$-(3,4-methylenedioxy-benzyl)-$N_5$-methyl-biguanide pharmaceutically acceptable acid addition salt.

References Cited

UNITED STATES PATENTS

| | | | |
|---|---|---|---|
| 3,247,221 | 4/1966 | Augstein et al. | 260—340.3 |
| 3,360,529 | 12/1967 | Gardner | 260—340.3 |

FOREIGN PATENTS

| | | |
|---|---|---|
| 1,476,752 | 4/1967 | France. |

ALEX MAZEL, Primary Examiner

J. H. TURNIPSEED, Assistant Examiner

U.S. Cl. X.R.

260—340.3; 424—278, 283

UNITED STATES PATENT OFFICE
CERTIFICATE OF CORRECTION

Patent No. 3,531,499          Dated Sept. 29, 1970

Inventor(s) Laszlo Beregi, Pierre Hugon, and Jacques Duhault

It is certified that error appears in the above-identified patent and that said Letters Patent are hereby corrected as shown below:

Col. 1 - line 60
Appl. p.2 - line 7

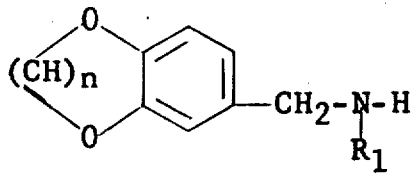

Should read:

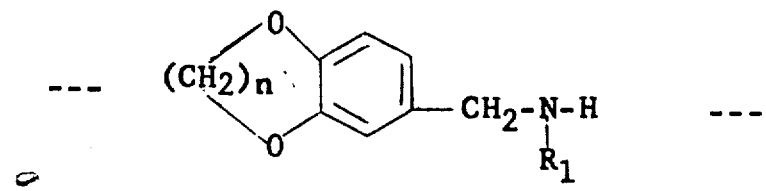

---

Col. 2 - line 32
Appl. p.3 - line 17

"metabloism"          should read   --- metabolism ---

SIGNED AND
SEALED
DEC 8 1970

(SEAL)
Attest:

Edward M. Fletcher, Jr.
Attesting Officer

WILLIAM E. SCHUYLER, JR.
Commissioner of Patents